United States Patent
Wiechard et al.

(10) Patent No.: US 10,962,265 B2
(45) Date of Patent: Mar. 30, 2021

(54) EXPANSION AND SHUTOFF VALVE

(71) Applicant: Hanon Systems, Daejeon (KR)

(72) Inventors: Dominik Wiechard, Cologne (DE); Andreas Capelle, Pulheim (DE); Markus Herzog, Bedburg (DE); Matthias Herpers, Jülich (DE); Jörn Fröhling, Cologne (DE); Marco Favara, Nörvenich (DE)

(73) Assignee: HANON SYSTEMS, Daejeon (KR)

( * ) Notice: Subject to any disclaimer, the term of this patent is extended or adjusted under 35 U.S.C. 154(b) by 82 days.

(21) Appl. No.: 15/805,286

(22) Filed: Nov. 7, 2017

(65) Prior Publication Data

US 2018/0135903 A1 May 17, 2018

(30) Foreign Application Priority Data

Nov. 11, 2016 (DE) .......................... 102016013492.5

(51) Int. Cl.

| F25B 41/06 | (2006.01) |
|---|---|
| F25B 41/31 | (2021.01) |
| B60H 1/00 | (2006.01) |
| F25B 41/35 | (2021.01) |
| F25B 41/38 | (2021.01) |
| B60H 1/32 | (2006.01) |

(52) U.S. Cl.
CPC ......... *F25B 41/31* (2021.01); *B60H 1/00485* (2013.01); *B60H 1/00907* (2013.01); *B60H 2001/3286* (2013.01); *F25B 41/35* (2021.01); *F25B 41/38* (2021.01); *F25B 2341/06* (2013.01); *F25B 2500/18* (2013.01)

(58) Field of Classification Search
CPC .............. F25B 41/062; F25B 2313/005; F25B 2341/06; F25B 2341/061; F25B 2341/065; F25B 2341/0653; F25B 2400/0411; F25B 2600/2513
See application file for complete search history.

(56) References Cited

U.S. PATENT DOCUMENTS

| 5,715,704 | A | * | 2/1998 | Cholkeri | ............. | F16K 31/0651 |
|---|---|---|---|---|---|---|
| | | | | | | 137/513.3 |
| 6,481,229 | B1 | * | 11/2002 | Yajima | .................. | F25B 41/062 |
| | | | | | | 236/84 |
| 2013/0082199 | A1 | * | 4/2013 | Matsumoto | ........... | F16K 39/022 |
| | | | | | | 251/129.07 |
| 2013/0098071 | A1 | * | 4/2013 | Means | .................. | F25B 41/062 |
| | | | | | | 62/56 |

(Continued)

OTHER PUBLICATIONS

WO 2006/090678 (English Translation) (Year: 2006).*

*Primary Examiner* — Jonathan Bradford
(74) *Attorney, Agent, or Firm* — Shumaker, Loop & Kendrick, LLP; James D. Miller

(57) ABSTRACT

An expansion and isolation valve, specifically an electric expansion and isolation valve for operation with the coolant R744, featuring a valve body arranged in a valve body chamber, a seal seat, and a seal, which are arranged along an axial movement direction of the valve body in the expansion valve. The expansion valve is further designed such that in a closed state of the expansion valve, there is a pressure bypass to the valve body chamber, and preferentially, that a valve body diameter at the positions of the seal seat and the seal corresponds with the respective seal diameters.

9 Claims, 3 Drawing Sheets

(56) References Cited

U.S. PATENT DOCUMENTS

| | | | |
|---|---|---|---|
| 2015/0048266 A1 | 2/2015 | Shen et al. | |
| 2015/0114495 A1* | 4/2015 | Zhan .................... | F25B 41/062 137/596.12 |
| 2015/0121951 A1* | 5/2015 | Zhan ...................... | F16K 3/265 62/528 |
| 2015/0129067 A1* | 5/2015 | Zhan .................... | F25B 41/062 137/614.16 |

* cited by examiner

EXPANSION AND SHUTOFF VALVE

CROSS REFERENCE TO RELATED PATENT APPLICATION

This patent application claims priority to German Patent Application No. De 10 2016 013 492.5 filed Nov. 11, 2016, the entire disclosure of which is hereby incorporated herein by reference.

FIELD

The present invention relates an expansion and isolation valve, specifically an electrical expansion and isolation valve for operation with R744 coolant.

BACKGROUND

In view of the state of the art of electromobility and its acceptance, it is important that the total architecture of electrical vehicles be optimized such that both their range and their environmental performance in general are maximized. As part of this optimization strategy, specific work is being done in order to optimize air conditioning systems for motor vehicles, specifically for electric vehicles, for instance in terms of weight and energy use. A main component of these systems that must be improved without loss of functionality are the expansion and isolation valves. Such improvements are also needed in terms of the use of environmentally compatible coolants such as, for instance, R744 (carbon dioxide, $CO_2$).

From prior art, it is known that R744 heat pump and air conditioning systems necessarily cause coolants to expand. In most heat pump systems, the direction of the coolant circuit must be changed during operations. This means that an expansion valve used therein must expand the coolant in two different directions. Conventional expansion valves do not have the ability to make such a bidirectional expansion possible. Furthermore, it is necessary that expansion valves be able to be opened entirely, so that any pressure drops will be limited. Furthermore, respective valve systems must be absolutely impermeable in both directions. Such a bidirectional impermeability makes it possible for coolant to be "caught" in the active circulation system.

From the aforementioned description follows a need for electrically operated expansion and isolation valves, specifically for R744-based systems, with the following properties:
  bidirectional expansibility,
  bidirectional tightness/impermeability, and
  bidirectionally maximized/full flow diameter,
  respectively, under high pressure up to the high pressure level of R744.

The fulfillment of these criteria has led in the past to a limited diameter of the valves and/or to larger assembly units which had to be powered by a larger actuator. In addition, there is a problem in that the high pressures lead to correspondingly high motive forces of the valve body or valve needle.

SUMMARY

The task of the present invention is to provide an expansion and isolation valve that meets the aforementioned requirements.

This task is solved by the expansion and isolation valve as shown and described herein.

The expansion and isolation valve according to the invention features a valve body, a valve needle arranged in a valve body chamber, a seal seat, an annular seal seat with a respective sealing component, and a seal such as an axial seal or a ring seal, which are arranged along an axial movement direction of the valve body in the expansion valve. The expansion valve according to the invention is designed so that in a closed state of the expansion valve, there is a pressure bypass to the valve body chamber, and a valve body diameter at the positions of the seal seat and the seal corresponds with the respective seal diameters. From this assembly follow smaller valve body forces and smaller operating forces for the valve according to the invention in its entirety, caused by a pressure balance (pressure equilibrium, pressure compensation). This is accomplished by the pressure bypass to the valve body chamber. Furthermore, the pressure balance is effectuated as a result of the fact that the valve body diameter (outside diameter) at the positions of the seal seat and of the seal corresponds with the respective seal diameters. From the pressure balance reached follows a smaller compressive force on the valve body, which makes it possible to guarantee a full, comparatively large, flow diameter between media access points of the valve according to the invention in two flow directions.

The aforementioned pressure bypass may be formed by way of an aperture in the valve body, and may include a channel in a tip of the valve body or a channel in the enclosure of the expansion valve. The conceivable channel structures serve, and may be designed for, the purpose of establishing a connection with the valve body chamber.

The expansion valve may further be designed so that it allows for a bidirectional flow and a bidirectional sealing of a medium flow through the valve. As described above, this is typically required for modern and efficient heat pump and air conditioning systems.

In the framework of the present invention, the expansion valve may be an electric expansion and isolation valve such as a Local Interconnect Network (LIN) controlled valve, featuring an electric actuator designed to activate the valve body, and to move the valve body between an opening position, an expansion position, and an isolation position, and further back and forth in a linear movement along and in the direction of an axial direction of the valve body. Furthermore, the expansion and isolation valve is designed at least for operating with the coolant R744, which is advantageous specifically with respect to the improved environmental compatibility of carbon dioxide as a coolant/refrigerant, and since its use and the use of the valve according to the invention in more environmentally friendly motor vehicles is advantageous. This allows for avoiding the use of the currently more typical coolants R134a and 1234yf. The valve body diameter may be the same at least at the positions of the seal seat and of the seal.

Overall, the advantages of the expansion and isolation valve according to an embodiment of the invention can be summarized as follows:
  an overall improved system performance or heating capacity,
  a space-saving design with a smaller construction size due to the possibility of using a smaller actuator due to the pressure balance;
  a modular construction for switching between the isolation valve and the expansion valve, for instance by way of a design change of the valve body or valve needle;
  allowing a bidirectional flow, and tightness, as well as openness nearly up to the full internal pipe diameter.

It follows directly from the descriptions above that it is advantageous to use the expansion and isolation valve according to the invention as part of efficiency-enhanced heat pump and air conditioning systems (air conditioners etc.), and in turn to use such systems in motor vehicles, for instance, and specifically in electric vehicles. The present invention therefore comprises the use of the expansion and isolation valve according to the invention in the aforementioned systems, but also the systems themselves, with the expansion and isolation valve according to the invention included in them.

Additional characteristics and advantages of the invention will be further explained based on the subsequent extensive descriptions and drawings.

DETAILED DESCRIPTION OF AN EMBODIMENT

Figure 1:
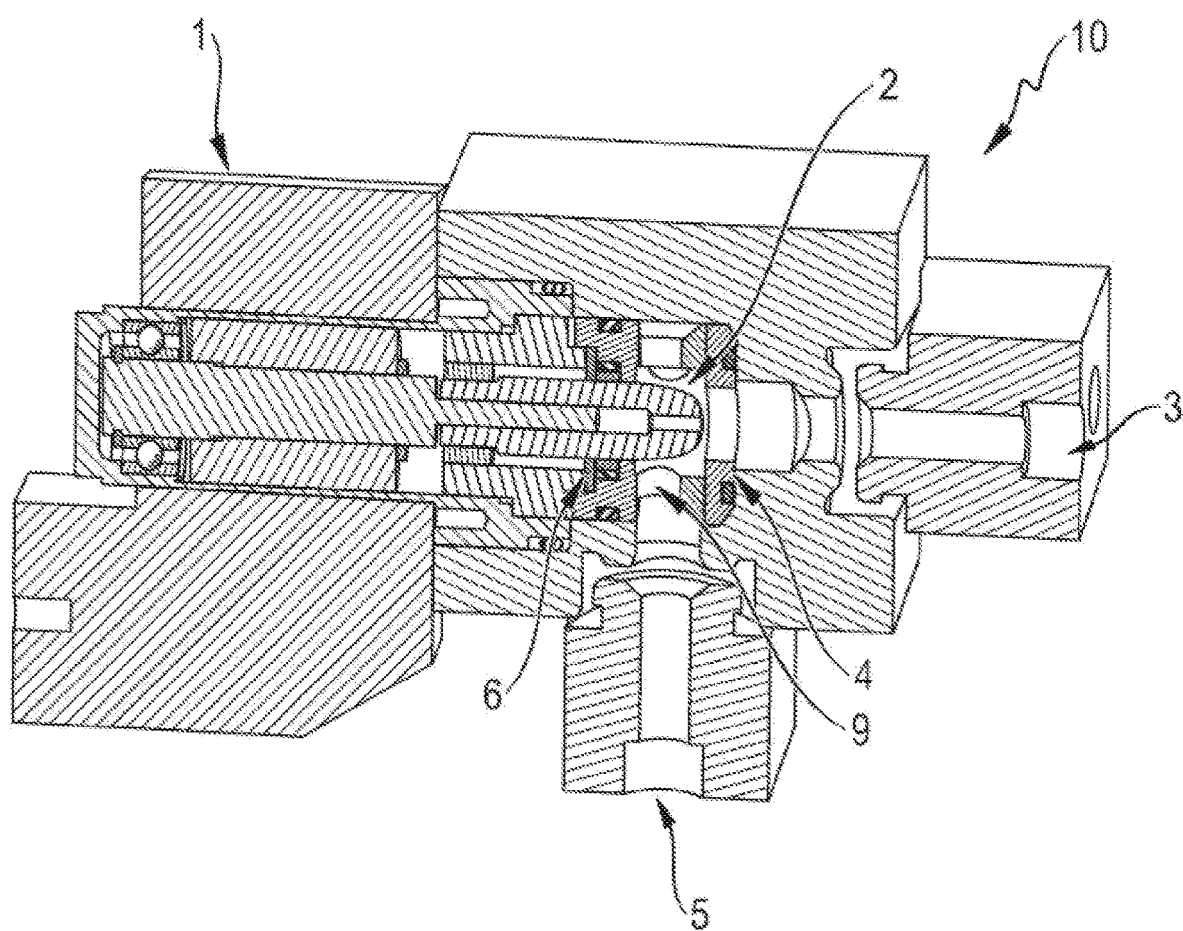
FIG. 1 shows a schematic cross-sectional perspective view of the expansion and isolation valve according to the invention in an opened state (opening state, opening position).

FIG. 1 shows a schematic cross-sectional view of the expansion and isolation valve 10 according to the invention in which the valve body 2 is in an opened position (opening position). It follows from FIG. 1 that the expansion and isolation valve 10 according to the invention comprises a series of individual modules. To begin with, the expansion and isolation valve 10 features an electric actuator 1, designed to move the valve body 2 within the expansion and isolation valve 10 linearly, back and forth between various positions. For these purposes, the electric actuator 1 is expediently connected with the valve body 2, which is expediently incorporated in the expansion and isolation valve 10 in a movable manner.

In the example in FIG. 1, the valve body 2 may be described as an elongated, cylindrical, and optionally as a tubular object or valve needle, and having a central axis, with one axial end having an inner surface 2a receiving a rod 1a of the electric actuator 1 therein and operatively interacting with the electric actuator 1. The other axial end of the valve body 2 guaranteeing the actual expansion valve 10 function. It is conceivable, for instance, that the valve body 2 features threading on the inner surface 2a thereof, which is engaged by the rod 1a of the electric actuator 1 which may have a threading thereon. Accordingly, the actuator 1 would therefore feature a shaft or the rod 1a, and the valve body would feature a respective counterpart, so that a rotational movement of the electric actuator 1 is converted into a linear movement of the valve body 2. The turning of this threaded rod 1a moves the valve body 2 linearly, that is, in a direction of its axial direction. The end of the valve body 2 guaranteeing the actual valve function features a specific curve contour at its end, which makes possible the expansion of the coolant in interaction with the other valve components. This contour can be designed and adjusted based on the respective expansion requirements. It can also be identified in FIG. 1 that there is an optional aperture 8 (See FIG. 3) which may be formed on the central axis of the valve body 2 in the end of the valve body 2 that features the expansion curve contour, which is connected with a hollowed-out interior of the tubular valve body 2.

The expansion and isolation valve 10 further features a first access point 3 and a second access point 5, which are designed wherein a coolant such as carbon dioxide may flow through the access points 3, 5 into the expansion and isolation valve 10, but also out of the access points 3, 5, respectively. This means that a bidirectional flow is possible through the expansion and isolation valve 10. In other words, depending on the flow direction of a coolant, the access points 3, 5 may respectively function as media inlets or as media outlets. FIG. 1 also shows an angular configuration of the access points 3, 5, which are therefore not positioned on a single axis. Rather, the longitudinal axes of the access points 3, 5 (the flow direction of the coolant) may form a right angle, for instance. When flowing through the access points 3, 5, the coolant within the expansion and isolation valve 10 is diverted correspondingly.

Furthermore, it can also be identified in FIG. 1 that a valve chamber 9 is formed in the axial direction of the valve body between a seal 6, which may be an axial seal or a ring seal with which the valve body is in full contact in its radial direction on the one hand, for example, and the seal seat 4, which is arranged closer to the access point 3, on the other hand. This valve chamber 9 is designed so that when the expansion and isolation valve 10 is in an opened position, that is, when the valve body 2 is in an axially withdrawn position (opening state) removed from the access point 3, it allows for a media communication between the access points 3 and 5. In this condition, the coolant may flow through the expansion and isolation valve 10 from access point 3 to access point 5 or back, or in other words, flow bidirectionally. As shown in FIG. 1, the valve body 2 is removed in its entirety from the coolant flow, and it effectuates only a modest pressure drop.

Figure 2:
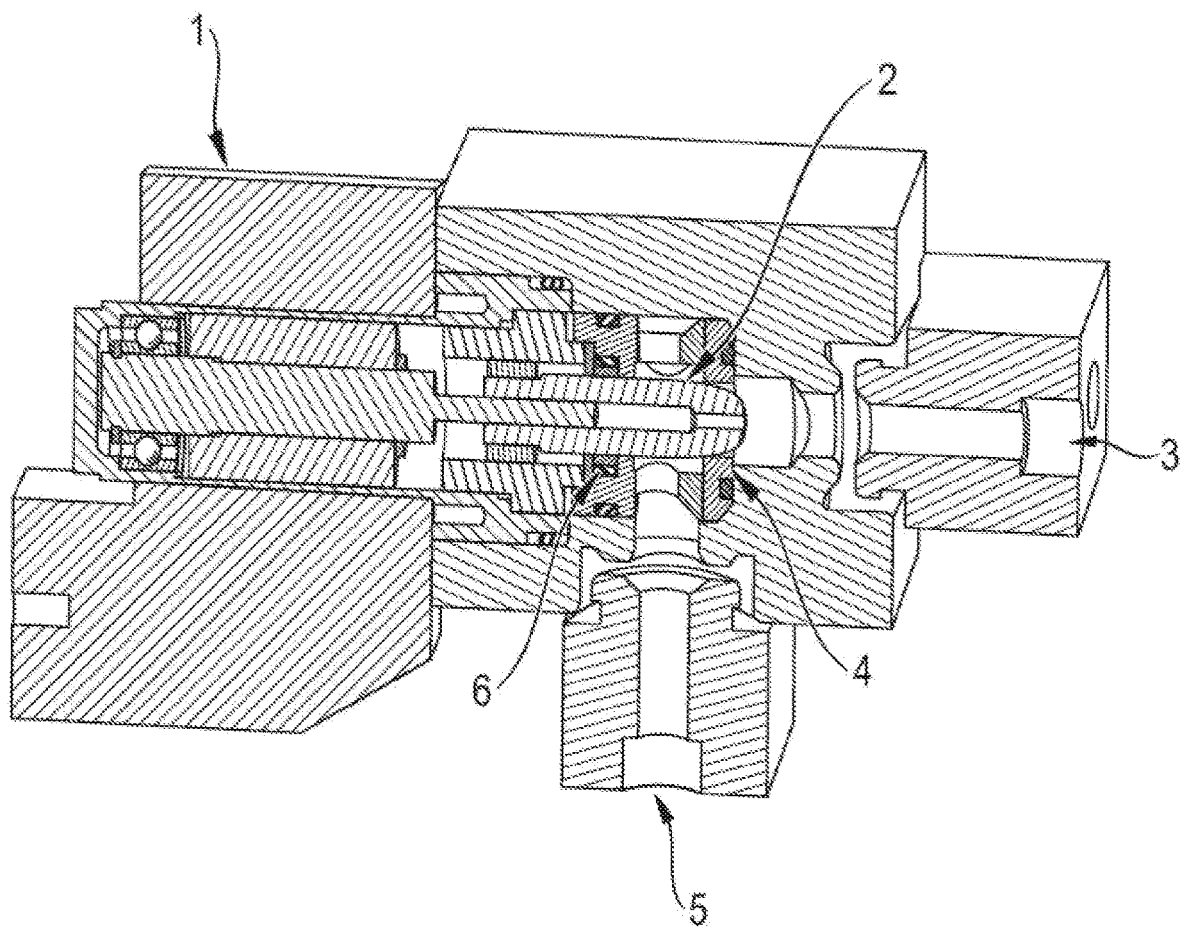
FIG. 2 shows a schematic cross-sectional perspective view of the expansion and isolation valve according to the invention in an expanded state (expansion position).

FIG. 2 shows an expansion condition of the expansion and isolation valve 10. For this condition, the valve body 2 is moved by the electric actuator 1 in the linear axial direction from the withdrawn position to an intermediate position which is closer to the seal seat 4 and the access point 3. In this position, there is a cooperation between the end of the valve body 2, which features the specific expansion curve contour, and the seal seat 4 and the immediately adjacent areas. If the seal seat 4 is assumed to be an annular component, through the interior aperture of which the coolant flows, this interior aperture (flow area) is reduced in size by way of the repositioning of the valve body 2 to the expansion position in such a manner that it leads to an expansion of the coolant and to its passage through the aperture via the valve chamber 9 to the respective other access point. This expansion effect is preferably bidirectional, meaning that an expansion of the coolant takes place when it flows from access point 3 to access point 5, but also when it flows in reverse from access point 5 to access point 3.

Figure 3:
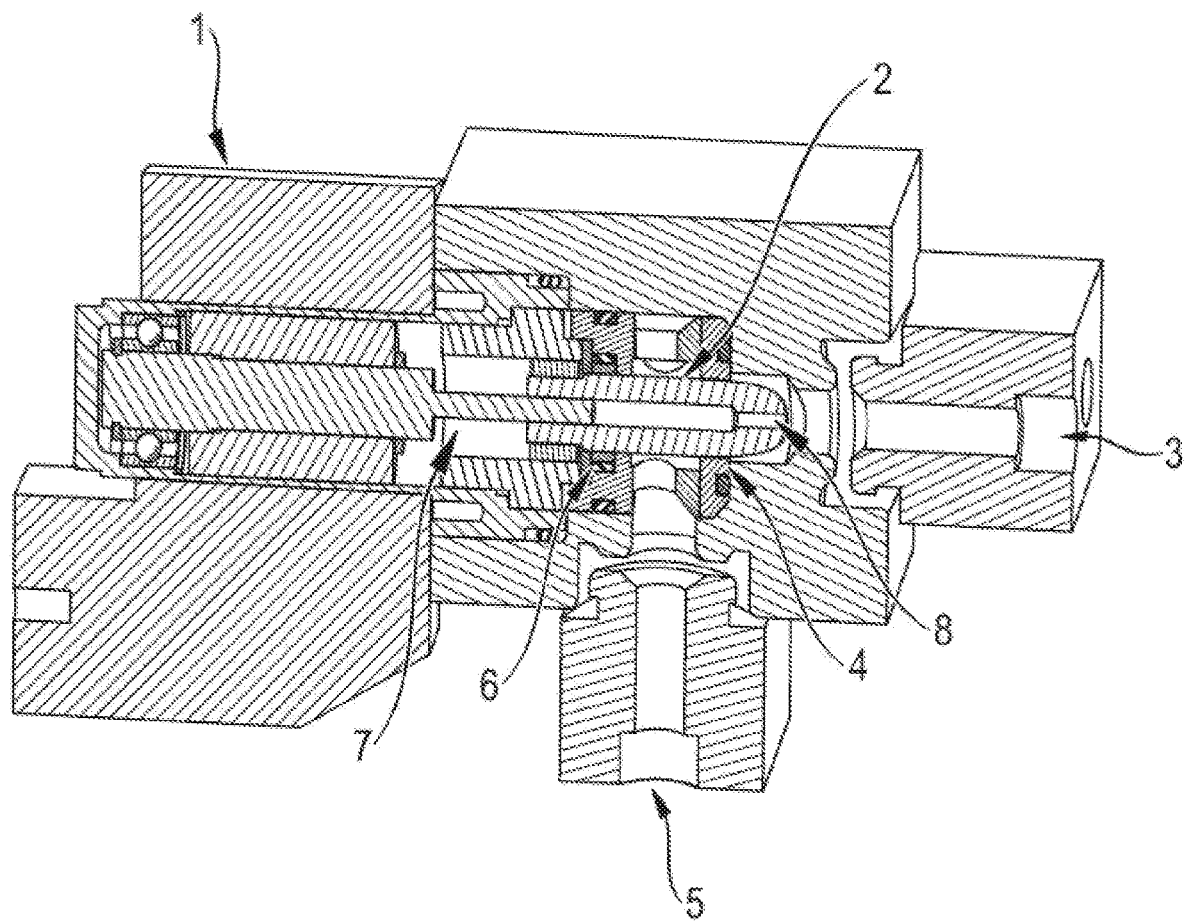
FIG. 3 shows a schematic cross-sectional perspective view of the expansion and isolation valve according to the invention in a closed state (isolating state, isolating position).

FIG. 3 shows the situation in which the valve body is moved by the electric actuator even further in the direction of the access point 3. The expansion and isolation valve 2 is then in a closed state, an isolation condition, which is reached under great pressure differences between the access points 3, 5, or the access points 5, 3, respectively. The expansion curve contour of one end of the valve body 2 now no longer cooperates immediately with seal seat 4. Rather it is axially moved beyond it. The seal seat 4 is now connected with a part of the cylindrical valve body 2 without the expansion curve contour. The same applies to the seal 6. In this state, there is an advantageous bidirectional tightness/imperviousness of the valve chamber 9, irrespective of the question as to at which of the access points 3, 5 there is a coolant under high pressure. The situation shown in FIG. 3 advantageously leads to smaller valve body forces and actuator forces due to a pressure balance. This is accomplished by way of a pressure bypass to the valve body chamber 7, which may be accomplished, for instance, by providing the shown aperture 8 in the valve body 2 or a bypass channel in the enclosure components of the expansion and isolation valve 10. Furthermore, the pressure balance is effectuated as a result of the fact that the diameter of the valve body 2 (outside diameter) at the positions of the seal seat 4 and of the seal 6 corresponds with the respective diameters of the seals 4, 6. In the embodiment shown, the diameter of the valve body 2 is identical in the two positions. From the accomplished pressure balance follows a modest compressive force to the valve body 2, wherefore it is possible to guarantee a full, comparatively large flow diameter between the access points 3, 5, or the access points 5, 3, respectively, in both directions.

LIST OF REFERENCE NUMBERS

1 electric actuator (drive)
2 valve body (valve needle, valve shaft)
3 media inlet or media outlet
4 seal seat
5 media inlet or media outlet
6 seal (axial seal)
7 valve body chamber
8 valve body opening (valve needle aperture)
9 valve chamber
10 expansion and isolation valve

The invention claimed is:

1. An expansion and isolation valve comprising:
a valve body arranged in a valve body chamber; and
a seal seat and a seal arranged along an axial movement direction of the valve body in the expansion and isolation valve,
wherein in a closed state of the expansion and isolation valve there is a pressure bypass to the valve body chamber, wherein a diameter of the valve body at positions of the seal seat and the seal corresponds with respective diameters of the seal seat and the seal, wherein the pressure bypass is formed by an aperture in the valve body including a channel in a tip of the valve body formed on a central axis of the valve body, and wherein a first passage is disposed on an opposite side of the valve body chamber with respect to the valve body along the axial movement direction of the valve body, and the valve body chamber communicates with the first passage by the pressure bypass, so that valve body forces are reduced.

2. The expansion and isolation valve according to claim 1, wherein the expansion and isolation valve allows a bidirectional flow and a bidirectional sealing of a medium flow through the expansion and isolation valve.

3. The expansion and isolation valve according to claim 1, wherein the expansion and isolation valve is an electric expansion and isolation valve.

4. The expansion and isolation valve according to claim 1, further comprising an electric actuator to actuate the valve body and move the valve body back and forth between an opening position, an expansion position, and an isolation position.

5. The expansion and isolation valve according to claim 1, wherein the expansion and isolation valve operates at least with a coolant comprising R744.

6. The expansion and isolation valve according to claim 1, wherein the diameter of the valve body at positions of the seal seat and the seal is identical when the expansion and isolation valve is in the closed state.

7. A heat pump system or an air-conditioning system including the expansion and isolation valve according to claim 1.

8. An electric motor vehicle including a heat pump system or an air conditioning system according to claim 7.

9. A method of using an expansion and isolation valve, the method comprising the steps of:
providing the expansion and isolation valve according to claim 1, wherein the expansion and isolation valve is configured for use in heat pumps and/or air conditioning systems.

* * * * *